Aug. 10, 1965  C. M. SULLIVAN  3,199,469
PALLET STRUCTURE
Filed Jan. 20, 1964  2 Sheets-Sheet 1
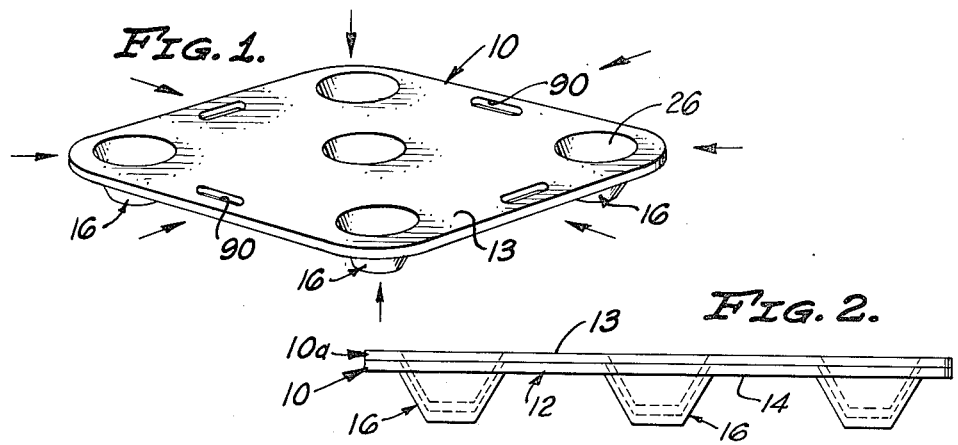
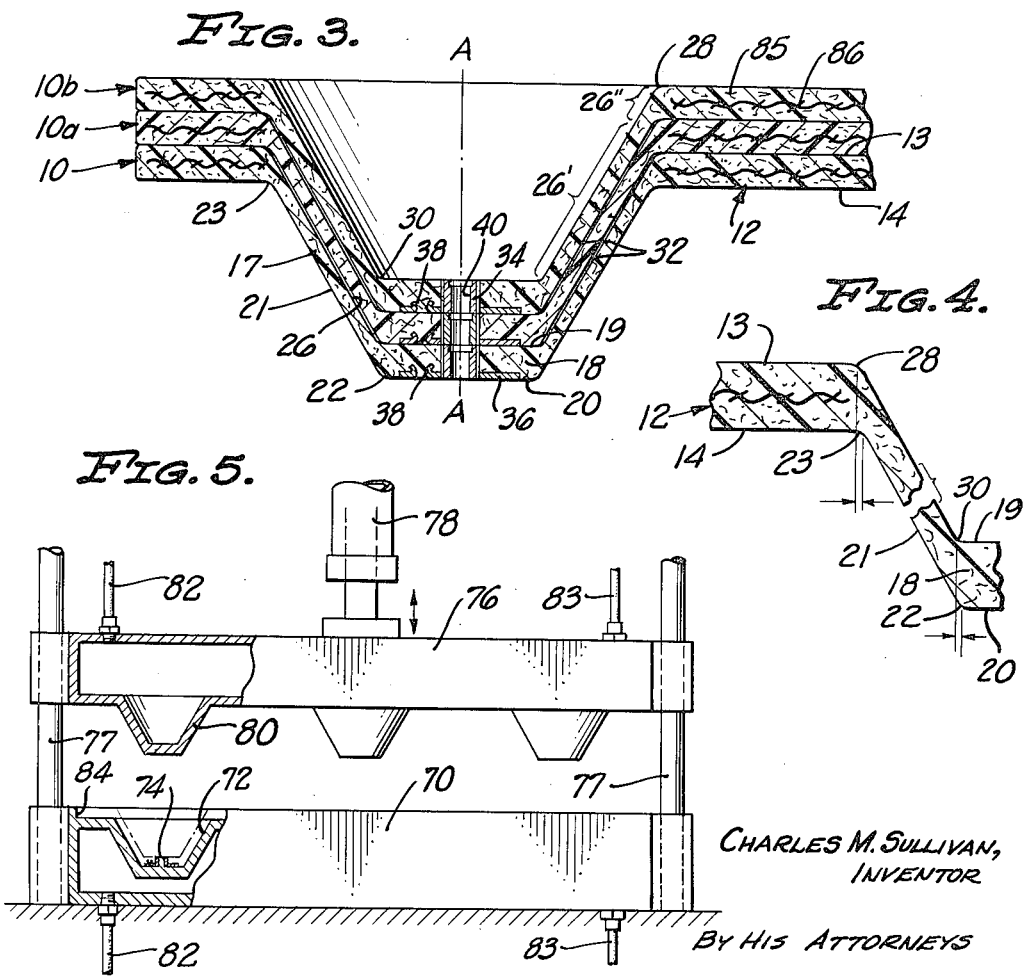
CHARLES M. SULLIVAN,
INVENTOR
BY HIS ATTORNEYS
HARRIS, KIECH, RUSSELL & KERN Aug. 10, 1965   C. M. SULLIVAN   3,199,469
PALLET STRUCTURE
Filed Jan. 20, 1964   2 Sheets-Sheet 2
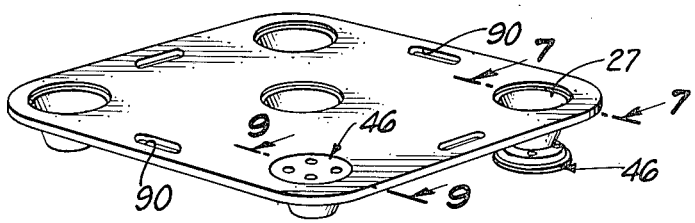
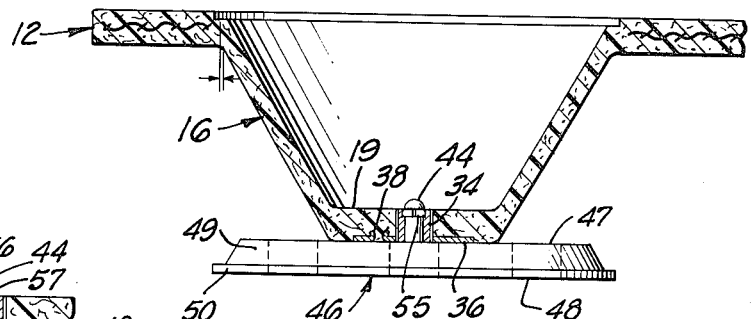
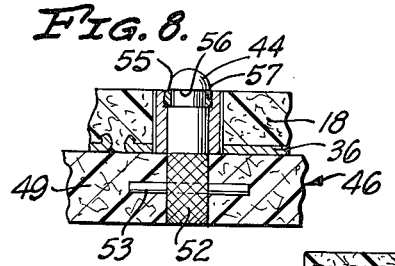
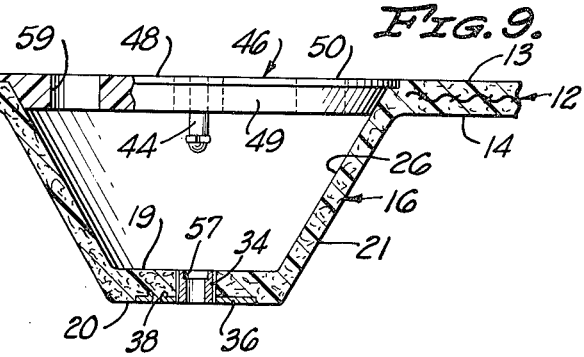
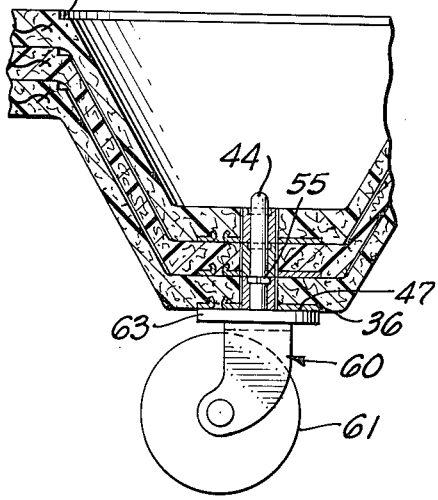
CHARLES M. SULLIVAN,
INVENTOR
BY HIS ATTORNEYS
HARRIS, KIECH, RUSSELL & KERN

United States Patent Office 3,199,469
Patented Aug. 10, 1965

3,199,469
PALLET STRUCTURE
Charles M. Sullivan, 5649 Aladdin St., Los Angeles, Calif.
Filed Jan. 20, 1964, Ser. No. 338,943
15 Claims. (Cl. 108—53)

My invention relates to pallets used industrially for supporting objects during processing or for storage or shipping the supported objects. The pallet is such that it and any load thereon can be transported from place to place by use of a fork-lift vehicle.

Present pallets of this nature are made of wood, consisting usually of a wood platform or deck with skid-like supports of wood at opposite ends to support the platform above the floor. Such pallets are bulky and cannot be nested. It is expensive to store empty pallets of this type or ship them back from a remote shipping point. The pallets tend to lose their strength and become waterlogged if exposed to the weather. They tend to absorb liquids spilled thereon and in the food industry cannot be sterilized between uses, as is now often required.

These and many other objectionable features of presently-used pallets are cured by the present invention which comprises a pallet formed of a hard and strong plastic material with any exposed metal inserts made of stainless steel. It is an object of the invention to provide such a pallet, designed for years of repeated use, which pallet is waterproof; resistant to weather conditions; capable of being cleaned or sterilized by steam; free of exposed fastenings or metal that might rust or provide crevices in which contaminants might collect—in general a pallet overcoming the objections and problems encountered in the use of known industrial pallets.

A further and important object is to provide a pallet that is completely nestable with identical pallets stacked together in use, storage or shipping. In this connection it is an object of the invention to provide a pallet having a deck or platform with hollow frustum legs depending therefrom and having bottom walls of a thickness equal to that of the platform so that the pallets can be stacked with their legs nesting together and with the platform and bottom wall of any pallet in the stack respectively in contact with the platform and bottom wall of a superposed or adjacent pallet. The hollow frustum legs are formed of the same plastic material as the platform and are permanently bonded thereto, preferably by being molded integrally therewith. The plastic of the platform, and if desired the hollow legs, can be suitably reinforced internally to provide the desired rigidity and strength.

Conventional pallets can be lifted by a fork-lift vehicle approaching in only one or an opposite direction. It is often desirable to effect lifting of a pallet by approach of the fork-lift vehicle from different directions. It is an object to provide a pallet that can be approached by the fork-lift vehicle in a plurality of directions. It may approach the embodiment to be exemplified in eight different directions preparatory to lifting the pallet or stack of pallets.

Pallets made of plastic material are subject to wear if slid along rough surfaces such as a concrete floor. It is an object of the invention to embed a wear plate or base plate of metal, preferably stainless steel, in the plastic of the bottom wall of each hollow leg if this is desired.

For drainage and for other purposes it is desirable to provide a central opening in the bottom wall of each hollow leg. It is an object of the invention to provide this and, if desired, to embed or mold in the plastic of such bottom wall a collar forming such central opening, the central opening acting to removably receive the pin of a support member such as a flat plate or caster on which the pallet may rest.

A further object as concerns one embodiment of the invention is to provide a support member that can selectively be applied to the bottom of one of the hollow legs or to a position in which it closes the opening in the platform above the interior of a hollow leg, acting in the latter position to make the support surface of the platform continuous.

Further objects and advantages of the invention will be evident to those skilled in the art from the following description of examplary embodiments.

Referring to the drawings:

FIG. 1 is a perspective view of a single pallet of the invention;

FIG. 2 is a side view of two of the pallets of FIG. 1 in stacked and nested relationship;

FIG. 3 is a fragmentary vertical sectional view of three stacked pallets;

FIG. 4 is a fragmentary sectional view of the side wall of one hollow leg, showing dimensional relationships;

FIG. 5 illustrates diagrammatically one type of molding apparatus that can be used in making one of the pallets of FIGS. 1–4;

FIG. 6 is a perspective view of an alternative embodiment of the invention showing two possible placements of the removable support members, one convering one of the leg openings and another below a hollow leg in supporting relation with the pallet;

FIG. 7 is a fragmentary sectional view showing the supporting member in the latter position and is taken along the lines 7—7 of FIG. 6;

FIG. 8 is an enlarged fragmentary view of the removable support member of FIG. 7;

FIG. 9 is a fragmentary sectional view taken along the line 9—9 of FIG. 6 showing the removable support member in its upper or leg-closing position; and FIG. 10 is a fragmentary sectional view showing a caster-type support member used to support a plurality of stacked and nested pallets.

The pallets of the invention are polygonal structures. Right-angular four-sided structures are preferred, e.g. of rectangular or square shape, the latter being illustrated. FIG. 1 illustrates a single pallet 10 of a shape to be stackable and nestable with superposed identical pallets 10a, 10b, etc. as suggested in FIG. 3.

Each pallet is molded of a hard, rigid, waterproof plastic material, preferably a thermosetting resin used with or without a filler such as wood flour. However many plastic formulations are known to plastic engineers that will be useful in forming the pallets. The plastic is preferably such as to maintain its shape and strength at temperatures between —50° F. and 250° F. so that the pallets retain their shape and strength when subjected to subzero temperatures or to temperatures encountered in steam cleaning thereof.

Each pallet provides a platform 12 having a top support surface 13 and a bottom support surface 14. The surface 13 is usually a smooth molded surface but may be roughened to prevent slipping of objects thereon. The surface 14 may similarly be a smooth molded surface or may be molded to be relieved in various portions to reduce weight and costs while still remaining sufficiently rigid to support heavy loads, e.g. up to 2,000 pounds on a single pallet.

A plurality of hollow frustum legs 16 made of plastic material are joined integrally with the platform 12, preferably by being molded integrally therewith. Four or more of such hollow legs are provided for each pallet and serve to support the platform 12 above the floor for receipt of the forks of a fork-lift vehicle, not shown. Five of such hollow legs 16 are exemplified, permitting the forks to enter the space below the pallet in any of the eight general directions indicated by the external arrows of FIG. 1.

Each hollow leg 16 is composed of a side wall 17 joined integrally with and preferably molded integrally with a bottom wall 18. Each bottom wall provides a molded top support surface 19 and a bottom support surface 20. Each side wall 17 provides a molded outer surface 21 extending between the bottom support surface 14 of the platform 12 and the bottom support surface 20 of the bottom wall 18. The projected intersecting planes of these surfaces meet respectively at a peripherally-closed edge 22 and a peripherally-closed base line 23. A small fillet is formed at this base line. Similarly the edge 22 is slightly rounded.

The interior of each hollow leg 16 opens upwardly on the top support surface 13 of the platform 12. It is bounded by a molded inner surface 26 formed compositely of a molded inner surface 26' of the side wall 17 and an inner surface 26" of an opening 27 in the platform 12. The inner surface 26" is a smooth continuation of the inner surface 26'. In the embodiment of FIGS. 1–4 the inner surface 26" extends to the top support surface 13 so that projections of these surfaces form a peripherally-closed edge 28 which is slightly rounded as shown. The inner surface 26' of the leg extends downward to the top support surface 19 of the corresponding bottom wall 18, projections of these surfaces meeting in a peripherally-closed base line 30. A small fillet is preferably formed at this junction. The peripherally-closed edge 28 is slightly larger, measured radially of the axis A—A of the hollow leg, than the base line 23. Likewise the base line 30 at the bottom wall 18 is slightly larger in radial dimension than the peripherally-closed edge 22. These dimensional relationships are best shown in FIG. 4. If the hollow legs 16 are frustoconical, as is usually preferred, the peripherally-closed edges 22 and 28 and the base lines 23 and 30 are circular but it should be understood that the invention contemplates other frustum forms for the legs.

The included angle between opposed portions of the inner surface 26 at the side wall of each leg is preferably in the neighborhood of about 60°. Each side wall 16 is thus at an angle of about 60° with respect to the plane of the top support surface 13. The side walls 17 are of a thickness less than the thickness of the platform 12, usually about half such thickness.

It is an important feature of the invention that the thickness of the platform 12, measured between the top support surface 13 and the bottom support surface 14, should be equal to the thickness of the bottom wall 18, measured between its top support surface 19 and its bottom support surface 20. A pallet thus constructed will stack and nest with identical pallets as suggested in FIGS. 2 and 3. In such a stack the top support surface 13 of one pallet will be in direct contact with the bottom support surface 14 of a superposed pallet, e.g. the pallet 10a. At the same time the bottom walls 18 of the nested legs will be in pressure-transmitting contact with each other. In this respect the top support surface 19 of each bottom wall will be in contact with the bottom support surface 20 of a superposed pallet. The result is that the bottom walls 18 stack one upon the other in physical contact and form a column. Any load applied to the top pallet of the stack will be distributed between the several side walls 17 of the nested hollow legs 16. If the bottom walls 18 were not in physical contact the entire load would be transferred to and carried by the lowermost hollow leg 16. The construction makes it possible to use a single pallet to support lighter loads and to stack two or more pallets together to support heavier loads, all without danger of overstressing the side walls 17 of the stacked and nested hollow legs.

It will be noted also that the side walls 17 of the nested legs do not wedge one within the other. When nested together the molded inner surface 26 of any leg is separated minutely from the molded outer surface 21 of the corresponding leg of the superposed pallet to leave a minute space 32 therebetween. This space can be very small, being exaggerated in FIG. 3 for the purpose of clarity. It need be only large enough to prevent wedging of the hollow legs 16 when they are nested as in FIG. 3.

In commercial practice the platform can be of any size, supplied with an appropriate number of the hollow legs 16. The thickness of the platform 12 and each bottom wall 18, measured between the top and bottom supporting surfaces thereof, will usually be in the range of about ¼ to ¾ inch. The thickness of the side wall 17 of each leg 16 is usually about one-half such thickness of the platform 12. The height of each hollow leg 16 measured below the bottom support surface 14 of the platform, can be any dimension suitable to receive the forks of the fork-lift vehicle, this height usually being about 2–4 inches in commercial practice, preferably about 3 inches. Each opening 27 in the platform will usually have a diameter of about 4–7 inches, measured at the top of the flare of its inner surface 26". A diameter of about 6 inches is usually satisfactory. The above dimensions are typical of those that have been found best in commercial practice for pallets designed to support loads of about 1,000 pounds or about 2,000 pounds. It should be clear however that the dimensions can be beyond the exemplified ranges for some uses of the pallets and that the invention is not limited to these ranges.

There should be a central opening in the bottom wall 18 of each leg 16 for drainage and other purposes. This opening may be molded therein but is preferably provided by a metal collar 34, preferably made of stainless steel, molded in the bottom wall 18 of each leg coaxial with the axis A—A. This metal collar has an outer roughened surface which provides projections around which the plastic material of the bottom wall is molded to lock the metal collar in place.

If desired, the bottom wall 18 of each hollow leg may be shod with a wear plate or base plate 36 molded therein substantially flush with the bottom support surface 20. As shown, this base plate is in the shape of a washer having a central opening receiving the collar 34. If used, this base plate is preferably made of stainless steel and includes portions 38 punched or bent upward therefrom embedded or molded in the plastic of the bottom wall 18 in anchoring relationship. The collar 34 and the wear plate 36 may be unitary or formed of separate elements as suggested.

Each collar 34 or any central opening molded in the bottom wall 18 forms an open-ended passage 40 traversing the corresponding bottom wall. These passages are in exact alignment when the hollow legs of several pallets are nested together.

Each passage 40 is adapted to receive a pin 44 of a removable support member 46, shown in FIG. 7 as a flat support member 46 and in FIG. 10 as a caster-type support member. An upper or inner support surface or face 47 of the FIG. 7 embodiment is then in engagement with the bottom face of the base plate 36. A lower or outer face 48 of the removable support member 46 then forms a floor-engaging surface. The removable support member in this FIG. 7 embodiment is essentially a disc of plastic material molded around and fixed to the pin 44 as shown in FIG. 8. The disc has a relatively thick body portion 49 from which a flange portion 50 protrudes. The pin 44 may be suitably anchored to the plastic when molded therein as by having an outer roughened surface 52 (FIG. 8) and/or by being traversed by a pin 53 with its ends embedded in the plastic.

The pin 44 is of a size to be slidably received by the metal collar 34. A detent means is provided to removably retain the pin in the collar. As suggested in the drawings, this detent means may include a split ring 55 disposed loosely in a peripheral channel 56 of the pin at a position to spring outwardly a minute distance into an annular groove 57 cut into the top of each collar 34 or molded in the plastic of the bottom wall 18 if no collar 34 is used. The outer surface of the split ring 55 may be rounded slightly to permit withdrawal of the support member 46 when use of this member is not desired in this position.

In the embodiment of FIGS. 6–10 the removable support members 46 can be used selectively as feet or pressure pads for the pallet or to close the openings 27 thereof if the support of small articles on the pallet makes this closure desirable. In this embodiment a shallow peripherally-continuous channel 58 is molded in the platform 12 adjacent the junction of the inner surface 26' and the top supporting surface 13. The flange portion 50 of the support member 46 is sized to fit in this shallow channel in such relationship that the outer face 48 of the support member is flush with the top supporting surface 13. The body portion 49 of the support member 46 is peripherally tapered to correspond to the angle of the hollow leg 16, being preferably slightly smaller than the inner surface 26' so as not to wedge therein. Each support member 46 is molded with one or more finger holes 59 to facilitate insertion and removal. The thick body portion 49 rigidifies the removable support member when acting either as a pressure pad (FIG. 7) or as a leg closure (FIG. 9). When in the latter position the pin 44 depends into the hollow interior of the leg 16. Except during stacking this latter position represents a convenient storage position for the removable support members 46.

If loaded or stacked pallets are to be shifted along the floor for small distances without resorting to the use of a fork-lift vehicle the removable support member 46 can take the form of a caster 60, see FIG. 10. This caster has the usual caster wheel 61 and should be of a type in which a disc 63 provides the aforesaid upper support surface or face 47 engaging the wear plate 36 to apply directly thereto the forces tending to tip the caster when loaded. The pin 44 is here the pin or shank of the caster and turns in the collar 34 of a pallet or in the collars of nested legs of stacked pallets. The split ring 55 of the detent means is then located to drop into the annular groove 57 of the collar 34 of the lowest pallet of a stack.

The pallet of FIGS. 1–4 can be molded in the molding equipment diagrammatically suggested in FIG. 5. As there shown a lower die 70 provides cups 72 shaped to conform to the outer surfaces of the hollow legs 16. The collar 34 and the base plate 36 may be initially placed on a pin 74 of each cup. A corresponding upper die 76 movable on guides 77 under the action of a ram 78 provides depending projections 80 corresponding in shape to the inner surfaces of each hollow leg 16. Sheets of reinforcement may be laid on the lower die 70 and if desired disposed in the cups 72 before the dies are closed. If external heat is desired to polymerize the plastic the dies may be made hollow and steam or other heating medium passed therethrough by use of inlet and outlet lines 82 and 83. Alternatively electric heating of the cups 72 and the depending projections 80 can be employed. The plastic to be used can be injected into the space provided by the closed dies or can be initially placed in the cups 72 to be spread outward by the closing of the dies to the periphery of the mold space, defined by any suitable peripheral wall 84. The illustrated die shape can be modified in minor respects to mold the pallet of FIGS. 6–9 with its shallow groove 58.

It is preferred that the platforms, and if desired the legs 16, be internally reinforced. This internal reinforcement may take the form of filaments or fibers 85 of glass or other filamentary material disposed throughout the plastic and initially mixed therewith. However in many instances it is desirable to employ the reinforcement in sheet form, particularly in the platform 12. Thus a sheet 86 of hardware cloth, a sheet of matted fibers, or a sheet of other reinforcing material can be laid on the lower die 70. Portions thereof can be deformed into the cups 72 during the closing of the dies to appear in the side walls 17 of the legs 16. Alternatively holes can be punched in the reinforcing sheet at positions corresponding to the cups 72 before the sheet is placed in the die. In this latter instance a separate frustum-shaped reinforcing element can be initially disposed in each cup to provide internal reinforcement for each leg 16. All such reinforcements can be impregnated by or encapsulated in the plastic material during the molding of the pallet.

By suitable design of the dies 70 and 76, hand holes 90 (FIGS. 1 and 6) can be molded in the pallet, preferably one at the center of each side thereof near the periphery. These do not substantially weaken the pallet and serve to facilitate manual handling thereof.

From the above it will be apparent that the pallets of the invention can be stacked in closely nested relationship either to support larger loads or for storage or shipping of empty pallets. A very large number of such empty pallets can be stacked and banded for initial shipment to the point of intended use or for return to a pallet pool or to the plant from which they were initially shipped in loaded condition. It will be apparent also that the pallets of the invention are waterproof and can be easily cleaned and sterilized to meet the exacting conditions in the food industry. The pallets are not easily scratched and can remain in use for years without deterioration. They thus offer many advantages over pallets heretofore known.

Various changes and modifications can be made without departing from the spirit of the invention as defined in the appended claims.

I claim:

1. A pallet stackable and nestable with pallets identical therewith, each pallet having a platform and a plurality of hollow frustum legs depending therefrom with their interiors flaring toward and opening on a top surface of the platform, each hollow leg being closed by a bottom wall, the side walls of the hollow legs being shaped to be slightly apart when nested within corresponding legs of the stacked pallets, said pallet being characterized by being molded of a rigid water-proof plastic material with said platform and said hollow legs joined integrally with each other, the thickness of each bottom wall being equal to the thickness of said platform so that the platforms of the pallets when stacked are in contact with each other and so that the corresponding bottom walls of the legs of the stacked pallets are in contact with each other to form a column, any load applied to the top pallet of the stack thus dividing between the side walls of the nested hollow legs.

2. A pallet stackable and nestable with pallets identical therewith, each pallet having a platform and a plurality of hollow frustum legs depending therefrom with their interiors open to the top surface of the platform through platform openings, each hollow leg being closed by a bottom wall, the side walls of the hollow legs being shaped to be slightly apart when nested within corresponding legs of the stacked pallets, said pallet being characterized by its platform and its legs being molded of a rigid waterproof plastic material with said platform and said hollow legs joined integrally with each other, each hollow leg having side walls of a thickness about one-half the thickness of the platform, each platform opening having an inner tapered surface forming a smooth continuation of a tapered inner surface of a corresponding hollow leg, and a reinforcing sheet within the platform having openings corresponding to the platform openings, the material of the reinforcing sheet extending at least to the junction of the platform and the side walls of the corresponding hollow leg, the pallet being stackable with identical pallets with the platforms of the stacked pallets in contact with each other and with the hollow legs nested together.

3. A pallet of molded water-proof plastic material stackable and nestable with pallets identical therewith to provide contact between the pallets in two areas at different elevations, each pallet comprising:

a platform made of said molded plastic material having a top support surface and a bottom support surface spaced from each other; and a plurality of hollow frustum legs made of said plastic material joined integrally with said platform, each hollow leg providing a bottom wall having a top support surface and a bottom support surface, each hollow leg providing a sloping peripherally-continuous side wall extending between said platform and said bottom wall, each side wall having an inner surface opening on said top support surface of said platform extending therefrom to said top support surface of said bottom wall, each side wall having an outer surface extending between said bottom support surface of said platform and said bottom support surface of such leg, the thickness of each side wall being less than the thickness of such platform and such bottom wall measured between the respective top and bottom support surfaces thereof, the thickness of said platform measured between its top and bottom support surfaces being the same as the thickness of the bottom wall of each hollow leg measured between its top and bottom support surfaces, said pallet stacking and nesting with the top support surface of the platform of any lower pallet in supporting contact with the bottom support surface of the platform of a superposed nested pallet and with the top support surface of the bottom wall of each hollow leg of such lower pallet in supporting contact with the bottom support surface of the bottom wall of a corresponding leg of the superposed nested pallet, the inner surface of each leg of such lower pallet being spaced minutely from the outer surface of the corresponding leg of the superposed pallet nesting therein when said pallets are stacked and said legs nested, thus preventing wedging of such nested legs.

4. A pallet as defined in claim 3 in which said platform has a plurality of openings therein corresponding to and coaxial with said hollow legs, each such opening having an inner surface forming a continuation of the inner surface of the side wall of the corresponding hollow leg.

5. A pallet as defined in claim 4 including a metal base plate molded in each bottom wall of each hollow leg substantially flush with said bottom support surface thereof and forming at least a part of such bottom support surface.

6. A pallet as defined in claim 5 in which said base plate includes portions bent upward therefrom embedded in the plastic of said bottom wall of the corresponding leg in anchoring relation.

7. A pallet as defined in claim 5 in which said base plate has a central opening, and including a metal collar molded in the bottom wall of the leg coaxial with said central opening and extending upward substantially to the top surface of the bottom wall of the leg to form an open-ended passage traversing the bottom wall.

8. A pallet as defined in claim 7 in which said metal collar has an outer roughened surface providing projections around which said plastic material of said bottom wall of the leg is molded to lock said metal collar in such bottom wall.

9. A pallet as defined in claim 7 including a removable support member having an upper support surface engaging said base plate, said support member having a pin extending above said support surface thereof of a size to be slidably received by said metal collar, and detent means removably retaining said pin in said collar.

10. A pallet as defined in claim 9 in which said removable support member is a caster having a caster wheel below said upper supporting surface.

11. A pallet as defined in claim 9 in which said removable support member is a flat plate having said upper support surface engageable with said base plate and having a lower floor-engaging surface.

12. A pallet as defined in claim 4 in which said inner surface of said opening extends to said top support surface of said platform and forms therewith a peripherally-closed edge, the outer surface of the corresponding hollow leg meeting the lower surface of said platform at a peripherally-closed base line slightly larger than said peripherally-closed edge measured radially of the axis of the hollow leg.

13. A pallet as defined in claim 4 including a peripherally-continuous channel at the junction of said inner surface of said opening and said top support surface of said platform, and including a removable support member of a peripheral shape and size to fit in said channel with an outer face thereof substantially flush with said top support surface of said platform with an inner face thereof extending across the space within the corresponding hollow leg.

14. A pallet as defined in claim 13 including a metal collar molded centrally in the bottom wall of each leg coaxial with the central axis thereof, and in which said removable support member includes a pin extending from said inner face, said pin being of a size to be removably received by said metal collar with said inner face engaging said bottom wall of the corresponding leg and with said outer face forming a downwardly-facing floor-engaging surface, and including detent means removably retaining said pin in said collar.

15. A pallet as defined in claim 13 in which said removable support member has a flange portion corresponding in shape and size to said peripherally-continuous channel and a smaller body portion extending from said flange portion in a direction away from said outer face, said body portion extending into the interior of the corresponding hollow leg when its flange portion is disposed in said peripherally-continuous channel.

References Cited by the Examiner

UNITED STATES PATENTS

| | | | |
|---|---|---|---|
| 2,463,214 | 3/49 | Stoner | 108—52 |
| 2,903,218 | 9/59 | Altenburg | 108—53 |
| 2,991,965 | 7/61 | Drieborg | 108—58 |
| 3,140,672 | 7/64 | De Luca | 108—53 |
| 3,141,422 | 7/64 | Woolworth | 108—56 |

FOREIGN PATENTS 828,506   2/60   Great Britiain.

FRANK B. SHERRY, *Primary Examiner.*